US012761062B2

(12) United States Patent
Körnle et al.

(10) Patent No.: US 12,761,062 B2
(45) Date of Patent: Oct. 13, 2026

(54) RADIOMETRIC FILL LEVEL, DENSITY, MASS FLOW AND/OR LIMIT LEVEL MEASURING DEVICE

(71) Applicant: VEGA Grieshaber KG, Wolfach (DE)

(72) Inventors: Ralf Körnle, Zell a.H. (DE); Florian Osswald, Gutach (DE)

(73) Assignee: VEGA Grieshaber KG, Wolfach (DE)

( * ) Notice: Subject to any disclaimer, the term of this patent is extended or adjusted under 35 U.S.C. 154(b) by 146 days.

(21) Appl. No.: 18/933,408

(22) Filed: Oct. 31, 2024

(65) Prior Publication Data

US 2025/0137830 A1 May 1, 2025

(30) Foreign Application Priority Data

Oct. 31, 2023 (DE) .................... 10 2023 130 136.5

(51) Int. Cl.
*G01F 23/288* (2006.01)
*G01N 9/24* (2006.01)
*G01T 1/20* (2006.01)

(52) U.S. Cl.
CPC ............ *G01F 23/288* (2013.01); *G01N 9/24* (2013.01); *G01T 1/2006* (2013.01)

(58) Field of Classification Search
None
See application file for complete search history.

(56) References Cited

U.S. PATENT DOCUMENTS 3,230,364 A * 1/1966 Clarke ............... G01N 15/0893 250/304
3,665,180 A * 5/1972 Guillot ...................... G06F 7/62 378/53
7,208,750 B2 * 4/2007 Umemura ............ G01T 1/2012 250/580
7,884,331 B2 * 2/2011 Majewski ............. A61B 6/037 250/363.04
2005/0173660 A1 * 8/2005 Umemura ............ G01T 1/2012 250/589
2010/0288935 A1 * 11/2010 Majewski ................ G01T 1/00 250/363.03
2025/0137830 A1 * 5/2025 Körnle ...................... G01T 1/17

FOREIGN PATENT DOCUMENTS

DE 102022103694 B3 * 5/2023 ......... G01F 23/2885
JP 2003098609 A * 4/2003

* cited by examiner

*Primary Examiner* — Thomas R Artman
(74) *Attorney, Agent, or Firm* — Wood Herron & Evans LLP

(57) ABSTRACT

The invention relates to a radiometric level, density, mass flow and/or limit level measuring device, having a housing which accommodates a scintillator for generating radiation-induced light pulses, a photosensitive element for generating electrical signals based on the light pulses, and an evaluation unit for evaluating the electrical signals and for determining a measured value, wherein the scintillator is pressed within the housing against an abutment with a contact force (FP) by means of at least one return element, wherein the measuring device comprises a compensation device having a counterweight and a force transmission device, wherein by means of the force transmission device, the weight force (g2) of the counterweight can be transferred to the scintillator in such a way that said force acts on the scintillator against the weight force (g1) of the scintillator.

11 Claims, 3 Drawing Sheets

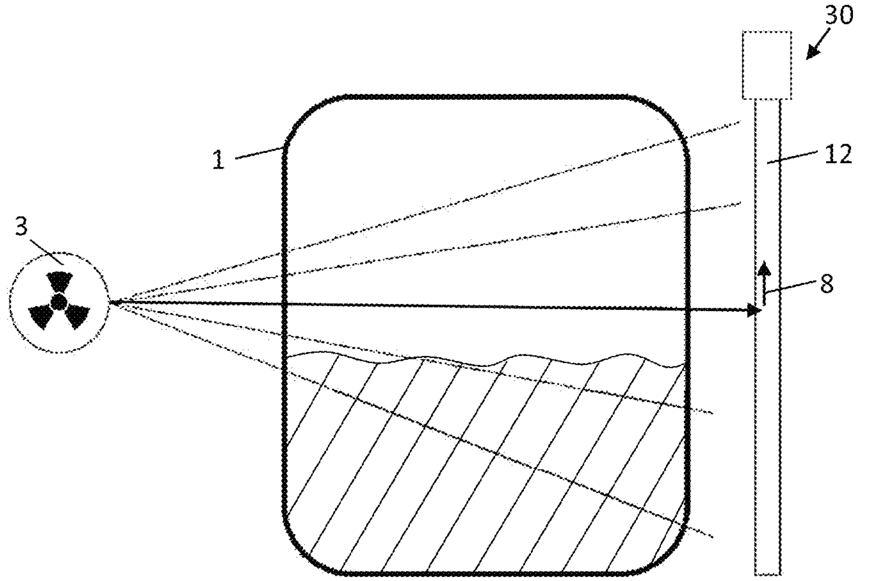
Fig. 1 (Stand der Technik)
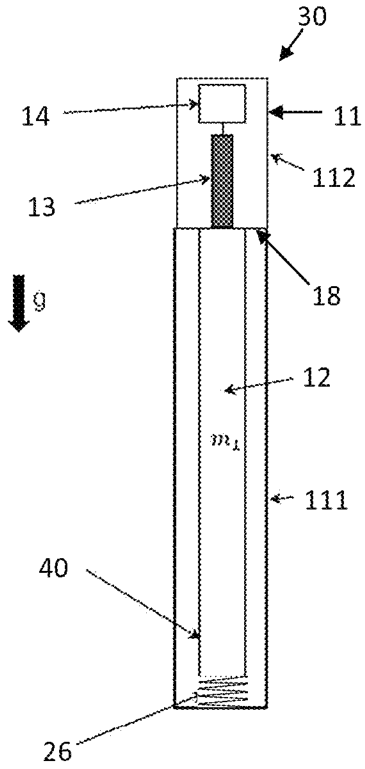
Fig. 2 (Stand der Technik)
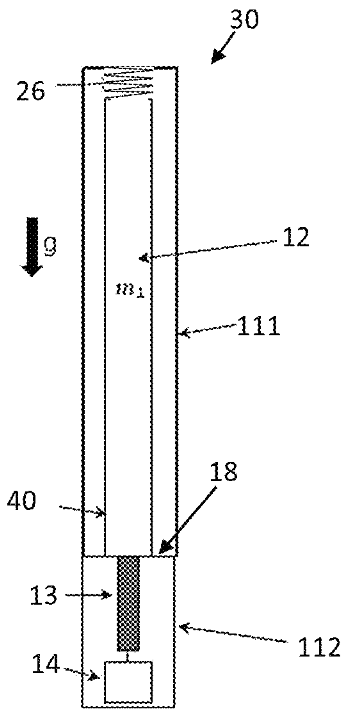
Fig. 3 (Stand der Technik)

RADIOMETRIC FILL LEVEL, DENSITY, MASS FLOW AND/OR LIMIT LEVEL MEASURING DEVICE

RELATED APPLICATIONS

This Application claims priority from Application 10 2023 130 136.5 filed on Oct. 31, 2023, in Germany. The entire contents of these applications are incorporated herein by reference in their entirety.

The invention relates to a radiometric fill level, density, mass flow and/or limit level measuring device.

An exemplary structure of such a measuring device 30 known from the prior art is shown in FIGS. 1 to 3. The measuring device interacts in particular with a radiation source 3, which radiates radioactive radiation through a container, tube or tank 1 to be measured onto the measuring device 30. The measuring device 30 measures this radiation. The medium shown hatched in FIG. 1 absorbs a part of this radioactive radiation. As the fill level changes, more or less radioactive radiation arrives at the measuring device 30 shown on the right of FIG. 1, from which a fill level of the tank 1 can be determined. The measuring device 30 can therefore be a fill level sensor. The measuring device 30 can also be suitable for measuring the density of a medium and can act as a density sensor. In particular, a radiometric measuring device has the advantage that a measurement is possible regardless of the process conditions within a tank and independently of the specific chemical composition of the filling material to be measured. Any corrosive properties are not relevant here, because the measuring device can be located outside the tank.

In order to avoid generating error states, it is normally necessary that the scintillator 12 in different mounting positions of the measuring device 30, two of which are shown in FIGS. 2 and 3, is pressed onto the abutment 18 without a gap under all thermal conditions and vibrations permissible for the measuring device 30. In the case of known prior-art measuring devices 30 the return element 26 is normally designed to be sufficiently strong for this purpose, depending on the mass m1 of the scintillator 12. The position of the critical region 40 of the scintillator 12, i.e. the region with the greatest mechanical stress, is particularly dependent on the mounting position of the measuring device 30 in the Earth's gravitational field g. The comparison between FIG. 2 and FIG. 3 illustrates the influence of the mounting position of the measuring device 30 in the Earth's gravitational field g and the influence of the return element 26 on the mechanical stress in the scintillator 12. In order to also ensure that the scintillator 12 presses against the abutment 18 without a gap even in the possible and permissible mounting position of the measuring device 30 shown in FIG. 2, the strength of the return element 26 or the force exerted by the return element on the scintillator 12 in the prior art is normally selected such that the mass m1 of the scintillator 12 is compensated, or that the weight force of the scintillator 12 is absorbed. In the prior art the necessary contact force of the scintillator 12 against the abutment 18 to be also applied by the return element 26 is added to this. In the mounting position shown in FIG. 3, in the critical region 40 of the scintillator 12, this force exerted by the return element on the scintillator 12 is then added to the weight force of the scintillator 12. The mechanical stress in the critical region 40 is significantly higher in FIG. 3 than in FIG. 2.

Therefore, in known measuring devices 30 the scintillator 12 is often severely mechanically stressed. In particular at high temperatures, plastic deformation of the scintillator 12 can occur in the critical region 40 when a permissible maximum mechanical stress is exceeded in the scintillator 12. In order to avoid this, the total length of the scintillator 12, the vibration resistance or the temperature ranges of the measuring devices 30 known from the prior art are often limited in practical application. In the context of this disclosure the term "permissible maximum mechanical stress in the scintillator" refers in particular to a mechanical stress in the scintillator, which if exceeded, means that damage to the scintillator, in particular to the scintillating material, is to be expected.

In a horizontal mounting position of the measuring device 30, not shown in the figures, the influence of the weight force through the direction of the gravitational field transverse to the longitudinal extension of the scintillator 12 on the maximum mechanical stress in the scintillator 12 is, by contrast, negligible. The maximum force on the scintillator 12 typically only acts when the vertical mounting of the scintillator 12 or the measuring device 30 as shown is used.

SUMMARY OF THE INVENTION

The object of the present invention is to propose a radiometric level, density, mass flow and/or level limit measuring device, which has an increased range of application compared to known measuring devices or in which a longer or heavier scintillator can be used.

This object is achieved by the invention disclosed herein.

Advantageous embodiments and variants of the invention arise from the following description. Thus, the features listed individually herein can be combined in any technically meaningful way, with other features described in detail in the following description, and constitute other advantageous variant embodiments of the invention.

A radiometric level, density, mass flow and/or limit level measuring device according to the invention comprises a housing which accommodates a scintillator for generating radiation-induced light pulses. The measuring device also comprises a photosensitive element for generating electrical signals based on the light pulses, and an evaluation unit for evaluating the electrical signals and for determining a measured value. The scintillator is pressed against an abutment within the housing with a contact force by means of at least one return element. The measuring device comprises a compensation device, having a counterweight and a force transmission device. By means of the force transmission device, the weight force of the counterweight can be transferred to the scintillator in such a way that said force acts on the scintillator against the weight force of the scintillator.

In this way, a reduction of the maximum mechanical stress in the scintillator can be achieved. The compensation device can reduce or at least partially compensate for the action of the weight force of the scintillator on the contact force or on the mechanical stress in the scintillator. Therefore, longer or heavier scintillators can be used without exceeding a permissible maximum mechanical stress in the scintillator. This can extend the range of application of the measuring device and the length over which it extends.

A weaker return element can be used, in particular without the measuring device losing its capability of being mounted in different mounting positions. This is because the return element can be at least partially relieved of the task of compensating for the mass of the scintillator, or also absorbing the weight force of the scintillator.

The use of the measuring device, e.g. when using polyvinyl toluene (PVT) scintillators, for example with lengths exceeding 3 m, can be permitted in a fairly large temperature range, e.g. 80 degrees Celsius to 100 degrees Celsius, without the use of an additional cooling device, because the mechanical properties of the scintillator are normally temperature-dependent.

Preferably, the measuring device does not have a cooling device and/or heating device.

The measuring device can be approved for applications with higher vibrations or g-accelerations, e.g. up to 5 g, 7 g or 10 g and in particular less than 15 g. In addition, installation space can be saved and the overall length of the measuring device can be shortened due to the weaker return element.

The measuring device comprises the scintillator, which consists in particular of a solid scintillating material with a density, for example, between 0.8 g/$cm^3$ and 1.2 g/$cm^3$. The geometrical dimensions of the scintillator result in a certain weight. The scintillator may be a plastic-based scintillator, in particular a polyvinyl toluene (PVT) scintillator. Alternatively, the scintillator may comprise a salt and, for example, be a NaI scintillator. The length of the scintillator is preferably greater than 10 cm, 30 cm, 1 m, 3 m or 4 m and further preferably less than 20 m or 10 m.

The counterweight can preferably also be referred to as a balancing weight and is formed in particular by a counterweight body.

By pressing the scintillator against the abutment of the measuring device, an optical coupling of the scintillator to the photosensitive element is preferably achieved. The abutment may be part of the photosensitive element and/or the housing. The photosensitive element may comprise a photomultiplier or be formed thereby. Preferably, the photosensitive element detects the light pulses generated in the scintillator and converts them into an electrical signal. The signal is preferably converted to a measured value by the evaluation unit. The scintillator can in principle have any desired shape. The scintillator can have a round cross-section, essentially all geometries, e.g. a cuboid shape, being possible. Preferably, the scintillator has a longitudinal extension extending parallel to its length.

The housing preferably encloses the scintillator. The housing may comprise or be made of steel. The housing may comprise or be made of plastic. Preferably, the housing is designed to absorb mechanical shocks or other effects. The housing can have a high strength.

The scintillator and the housing have different coefficients of temperature expansion depending on the material. Preferably, a resilient mounting or suspension of the scintillator on the housing is achieved by means of the compensation device. Preferably, the compensation device together with the return element is used to bring about a required length compensation due to different temperature expansion coefficients of the scintillator and the housing, while maintaining the gap-free contact of the scintillator against the abutment. Preferably, by means of the compensation device and/or the return element the scintillator is pressed onto the abutment without gaps in different mounting positions of the measuring device and under all thermal effects permissible for the measuring device and vibrations permissible for the measuring device.

The housing may comprise a first housing section into which the photosensitive element and the evaluation unit can be integrated. The housing may comprise a second housing section in which the scintillator and the compensation device may be arranged. The two housing sections can be provided as separate housing parts or as a single piece. Preferably, the scintillator in the housing, in particular the second housing section, is movable, in particular parallel to its longitudinal extension. The abutment is preferably immovable relative to the housing, in particular the first housing section, and can be provided by the latter.

The magnitude of the contact force can—in particular in different mounting positions of the measuring device—correspond to the magnitude of the force exerted by the return element on the scintillator. The mass of the counterweight can be at least approximately the same as the mass of the scintillator. Alternatively, the mass of the counterweight may be smaller than the mass of the scintillator. It may be greater than or equal to 9/10 or 8/10 or 7/10 or 6/10 or 1/2 or 1/4 or 1/10 of the mass of the scintillator.

The maximum mechanical stress occurring in the scintillator is defined in particular by a force corresponding to the sum of the weight force of the scintillator and the force exerted by the return element on the scintillator. In addition, vibration loads and thermal expansion of the system and thus increase the spring force can be added to the load cases. The return element is preferably so weak that a defined contact force on the abutment prevails, which is in particular, however, smaller than the weight force or 3/4 of the weight force or 1/2 of the weight force or 1/4 or 1/10 of the weight force of the scintillator, or greater than 1/100 or 1/1000 of the weight force of the scintillator. Preferably, the use of the compensation device ensures that the maximum mechanical stress occurring in the scintillator in different mounting positions of the measuring device is defined by a force that is less than twice the weight force of the scintillator. Preferably, the return element can also be selected to be weak because the effect of the weight force of the scintillator on the contact force or on the mechanical stress in the scintillator can be reduced or at least partially compensated by means of the compensation device, preferably also in the case of vibrations or accelerations, since vibrations and/or accelerations act on the counterweight in the same way.

The measuring device is preferably designed for installation in different mounting positions. The different mounting positions preferably comprise a first mounting position in which the scintillator is arranged below the abutment. The different mounting positions preferably comprise a second mounting position in which the scintillator is arranged above the abutment. The two mounting positions may differ by a rotation of the measuring device by 180 degrees about an axis perpendicular to the longitudinal extension of the scintillator. The longitudinal extension of the scintillator can be vertical in the first and/or the second mounting position. Preferably, the force transmission device is designed to transfer the weight force of the counterweight onto the scintillator in such a way that the weight force of the counterweight in the first and second mounting positions acts on the scintillator against the weight force of the same.

The different mounting positions preferably include a third mounting position in which the longitudinal extension of the scintillator extends at least to a large extent horizontally. The different mounting positions can additionally include any desired mounting positions, which means the measuring device is able to be mounted in any mounting position.

Preferably, the compensation device—considered in isolation and/or together with the return element—causes a mechanical compressive stress in a region of the scintillator in the first mounting position of the measuring device and a mechanical tensile stress in the same region in the second mounting position of the measuring device.

The measuring device comprises the return element. The return element may comprise or be formed by a spring. The return element or spring may be pretensioned in the measuring device. If the pretensioning force is smaller than the weight force of the scintillator, then the maximum mechanical stress in the scintillator can be reduced. The size of the pretensioning force can at least approximately correspond to the size of the contact force in various mounting positions.

Preferably, the contact force with which the scintillator is pressed against the abutment by means of the at least one return element is less than the weight force of the scintillator in the first and the second, or in all permissible mounting positions. This allows the mechanical stress acting in the scintillator to be prevented from exceeding the maximum permissible mechanical stress, in particular in large or long scintillators.

Preferably, the compensation device causes the size of the contact force at the first mounting position to deviate from the size of the contact force at the second mounting position by less than the weight force of the scintillator. The contact force can only be chosen, in particular by means of the return element, as high as is necessary for maintaining the gap-free contact of the scintillator with the abutment, in particular in all permissible mounting positions, permissible thermal conditions and permissible vibrations.

Preferably, the force transmission device allows the weight force of the counterweight to be transferred to the scintillator via an adapter of the force transmission device arranged on the scintillator. The adapter may comprise or be formed by a holding part, flange or first bearing part.

Preferably, the force transmission device mechanically couples the counterweight to the scintillator.

Preferably, the force transmission device comprises a balance. The balance can preferably also be referred to as a rocker.

Preferably, the force transmission device or balance comprises a two-sided lever with a first lever arm and a second lever arm. The two-sided lever is preferably mounted on the housing with its pivot point by means of a rotary bearing. Preferably, the scintillator is attached to the first lever arm and the counterweight is attached to the second lever arm. The effective length of the first lever arm, in particular the maximum extension of the lever arm from the pivot point in the direction perpendicular to the longitudinal extension of the scintillator, can be—in particular in the embodiment in which the mass of the counterweight is at least approximately the same size as the mass of the scintillator—at least approximately equal to the effective length of the second lever arm. Alternatively, the effective lengths of the two lever arms may differ. The ratio of the effective length of the first lever arm to the effective length of the second lever arm can correspond to the ratio of the mass of the counterweight to the mass of the scintillator. If the mass of the counterweight, e.g. to reduce the total weight of the measuring device, corresponds for example to half the mass of the scintillator, then the effective length of the second lever arm can be twice as large as the effective length of the first lever arm.

Preferably, the scintillator is attached to the first lever arm at or in the region of the free end of the scintillator. This refers, in particular, to the opposite end of the scintillator from the abutment.

Preferably, the scintillator is attached to the first lever arm by means of a further rotary bearing, in particular a rotary fixed bearing. As a result, the risk of application of a tilting moment, which threatens to break the gap-free contact of the scintillator against the abutment, to the scintillator by the force transmission device under thermal expansion or contraction of the scintillator can be reduced. This additional rotary bearing preferably comprises a first bearing part assigned to the scintillator and a second bearing part assigned to the first lever arm. The first bearing part is preferably rotatable relative to the second bearing part. This additional rotary bearing can allow rotation between the first lever arm and the scintillator about exactly one axis of rotation and block all further rotational degrees of freedom and translational degrees of freedom between the first lever arm and the scintillator.

The scintillator can be attached to the first lever arm by means of the adapter or directly. The attachment of the scintillator to the adapter or to the first lever arm can be effected by or by means of clamps, in particular by or by means of a frictional connection, e.g. by means of a bracket, in particular of the adapter, which can be reduced to the outer diameter of the scintillator. The attachment of the scintillator to the adapter or to the first lever arm can be effected by or by means of adhesives, in particular by means of or via a materially bonded connection, e.g. between the outer material of the scintillator and the adapter, or directly to the first lever arm. The scintillator can be attached to the adapter or to the first lever arm by or by means of casting, thus in particular by or by means of a positive-fitting connection. This can be done, for example, by having the adapter inserted into the mould and enclosed by the scintillator material during the scintillator manufacturing process. After curing, a positive-fitting connection is preferably formed. The attachment of the scintillator to the adapter or to the first lever arm can be carried out by or by means of milling, in particular by or by means of a post-processing of the already cured scintillator material, for example, in such a way that a contour is formed into or onto which the adapter can be attached in a positive-fitting manner.

The first lever arm and/or the second lever arm may be length-adjustable. For this purpose, the first lever arm and/or the second lever arm may comprise a guide which guides the regions of the respective lever arm towards each other. The guide may comprise a linear guide or a parallel guide. Parallel guide is used in particular to mean a guide that maintains the parallelism of the regions of the respective lever arm guided towards each other in the event of a change in length of the lever arm. Preferably, the guide is torsionally rigid, thus preventing the regions of the respective lever arm guided towards each other from twisting relative to each other. The length variability of the first lever arm can serve to reduce the risk of application of a tilting moment, which threatens to break the gap-free contact of the scintillator against the abutment, to the scintillator by the force transmission device under thermal expansion or contraction of the scintillator. The length variability of the second lever arm can be used, for example, to enable or simplify an axially displaceable arrangement of the counterweight, which is designed as a tubular weight, around the scintillator.

It may be provided that the attachment of the scintillator to the first lever arm does not take place at the free end of the scintillator, but, for example, on the half of the scintillator facing the abutment or on third of the scintillator facing the abutment.

The counterweight can be rigidly attached to the second lever arm, so that all six degrees of freedom of the counterweight relative to the second lever arm can be blocked.

Alternatively, the scintillator can be attached to the second lever arm by means of an additional rotary bearing, in particular a rotary fixed bearing. This can allow rotation between the second lever arm and the counterweight about exactly one axis of rotation and block all other rotational degrees of freedom and translational degrees of freedom between the second lever arm and counterweight. This additional rotary bearing can be designed to corresponding to the additional rotary bearing between the scintillator and the first lever arm.

Instead of a mechanical coupling of the counterweight to the scintillator a hydraulic or pneumatic coupling is also possible.

For this purpose, the force transmission device can comprise at least two fluid cylinders, in particular instead of a balance and the rotary bearings. In this embodiment, the force transmission device can do without rotary bearings and/or linear guides. Preferably, one of the fluid cylinders interacts with the scintillator and the other fluid cylinder interacts with the counterweight. The fluid cylinders are preferably each double-acting and further preferably designed as hydraulic cylinders. Both fluid cylinders preferably each comprise a housing, a piston dividing the interior of this housing into two chambers, and a piston rod. Preferably, one of the fluid cylinders is arranged between the scintillator, in particular its free end, and the housing. Further preferably, the two chambers of this fluid cylinder—in particular by means of fluid lines preferably designed as hydraulic lines—are connected to the chambers of the other fluid cylinder. This other fluid cylinder is arranged in particular between the counterweight and the housing. Both fluid cylinders are preferably each designed as differential cylinders with a piston rod-side annular volume and a piston-side volume. Preferably, the two piston rod-side annular volumes of the two fluid cylinders are connected to each other by means of one of the fluid lines and further preferably the two piston-side volumes are connected to each other by means of the other fluid line. The size of the piston surfaces of both cylinders can be identical—in particular in the embodiment in which the mass of the counterweight is at least approximately the same size as the mass of the scintillator. The same applies to the size of the piston ring surfaces. The cylinders can in fact be the same overall. Alternatively, the force transmission device can comprise a compression ratio, by the fact that the piston surfaces of the two cylinders are of different sizes. The ratio of the sizes of the piston surfaces of the two cylinders can be proportional to the ratio of the mass of the scintillator to the mass of the counterweight. The ratio of the stroke of the two cylinders can be inversely proportional to the ratio of their piston surfaces. If, e.g. in order to reduce the total weight of the measuring device, the mass of the counterweight is equal for example to half the mass of the scintillator, then the piston surface of the cylinder interacting with the counterweight may be half the size of the piston surface of the cylinder interacting with the scintillator and the stroke may be twice as large. Preferably, the ratio of the piston ring surface areas corresponds to that of the piston surfaces. In the event of a change in length of the scintillator relative to the housing, a displacement of the two pistons and a compensation can preferably take place via both fluid lines. Depending on the mounting position, the weight force of the counterweight can be transferred to the scintillator in particular via the fluid line which connects the annular volumes to each other or via the fluid line which connects the piston-side volumes to each other. Both fluid cylinders—or at least the fluid cylinder that interacts with the scintillator—can be designed as short-stroke cylinders to save installation space. The stroke of the cylinder interacting with the scintillator may be slightly, e.g. at least 10% or 20% and/or not more than 100%, greater than the maximum length change of the scintillator relative to the housing. This stroke may be less than 60 mm and/or more than 2 mm, e.g. in PVT scintillators with an example length of 5000 mm.

The return element can be arranged between the housing of the cylinder arranged between the scintillator and the housing, and the scintillator. Preferably, the ends of the piston rods facing away from the pistons are each directly or indirectly fixedly connected to the scintillator or the counterweight, for example glued and/or screwed. For the indirect connection, at the ends of the piston rods which are facing away from the piston, a connecting element which increases the contact surface with the scintillator or counterweight, for example a plate, is fixedly attached, for example welded, to them. For the indirect connection of one of the piston rods to the scintillator, this piston rod or the associated connecting element can be connected to the adapter arranged on the scintillator. The piston rods of both fluid cylinders can run parallel to each other or to the longitudinal extension of the scintillator. Preferably, they point in the same direction with their ends facing away from the pistons.

The counterweight and/or the return element are preferably arranged spatially with respect to the scintillator such that they do not increase the length of the measuring device parallel to the longitudinal extension of the scintillator, or only increase it by less than their own extension parallel to the longitudinal extension of the scintillator.

The counterweight and/or the return element may be arranged, at least in some regions or sections, next to the scintillator.

It may be provided that the counterweight is arranged axially to be displaceable around the scintillator as a tubular weight.

The at least one return element can be formed in diverse ways and arranged within the housing. Preferably, the return element exerts a restoring force, in particular a spring force, indirectly or directly on the scintillator. The return element is preferably arranged such that its return force causes an increase in the contact force, in particular irrespective of the mounting position of the measuring device. The return element can be a spring, e.g. a compression spring, shaft spring, Belleville spring, or tension spring. The return element can be formed as a pressure return element, e.g. in the form of a compression spring, such as a helical compression spring or gas compression spring. The return element can alternatively be designed as a tension return element, e.g. in the form of a tension spring, such as a helical tension spring or a gas tension spring. The return element can comprise a hydraulic or pneumatic cylinder. The return element may comprise a torsion spring. The torsion spring can be arranged on one of the rotary bearings. The return element can be arranged between the counterweight and the housing. The return element may also be arranged between the counterweight and the abutment and/or between the scintillator, in particular its free end, and the housing. The return element may also be arranged between the optional additional rotary bearing, which is arranged between the scintillator and the first lever arm, and the housing, or between the optional additional rotary bearing, with which the counterweight is attached to the second lever arm, and the housing. The return element may also be arranged between the first and/or second lever arm and the housing. The return element can comprise a plurality of springs. The return element can be arranged on one of the fluid cylinders of the force transmission device. The force transmission device is preferably different from the return element.

It may be provided that the at least one return element surrounds the scintillator, at least in sections. As a result, the return element is not arranged completely between the end face of the free end of the scintillator and the housing, but at least in some regions or some sections next to the scintillator, so that the housing can be designed to be shortened by the minimum length of the return element. Preferably, a flange is provided which is connected to the scintillator and has an annular contact surface for making contact with the at least one return element. The flange can be detachably or non-detachably connected to the scintillator. It may be provided that the flange has a recess that accommodates the free end of the scintillator. Such a recess may be designed in the form of a blind hole with a base closed at the bottom. Alternatively, the flange can be designed as a disk which is attached to the end face at the free end of the scintillator. Furthermore, the flange may be formed as a cuff with an opening which is penetrated by the scintillator. The flange may comprise or be formed by the adapter arranged on the scintillator, or the first bearing part of the rotary bearing between the scintillator and the first lever arm. It may be provided that a plurality of return elements arranged in the shape of a ring are arranged, which together surround at least sections of the scintillator. The scintillator is preferably an elongated structure. For the purposes of the present disclosure, elongated means that the longitudinal extension of the scintillator is significantly greater than a maximum extension perpendicular to the longitudinal extension. Preferably, the longitudinal extension is at least five times, more preferably at least ten times, at least fifty times, particularly preferably at least one hundred times the maximum extension perpendicular to it. According to an advantageous embodiment of the invention, the scintillator may be designed to be cylindrical or cuboid, for example with a square cross-section, and such that it extends along a longitudinal axis and the return element is radially spaced apart from the scintillator in relation to the longitudinal axis. The at least one return element is preferably spaced radially apart from the scintillator in relation to the longitudinal extension.

BRIEF DESCRIPTION OF THE DRAWINGS

In the following, specific embodiments of the present invention are described with reference to the figures. In the drawings, schematically in each case:

FIG. 1 shows a radiometric measuring device according to the prior art,

FIG. 2 shows a radiometric measuring device according to the prior art,

FIG. 3 shows the measuring device of FIG. 2 in another mounting position.

DETAILED DESCRIPTION OF THE DRAWINGS

In the introduction to the description, the measuring principle of a radiometric fill level, density, mass flow and/or level limit measuring device was explained with reference to FIGS. 1 to 3.

FIGS. 4 to 9 show different specific embodiments of radiometric level, density, mass flow and/or limit level measuring devices according to the present disclosure, which can interact with at least one radiation source.

Figure 4:
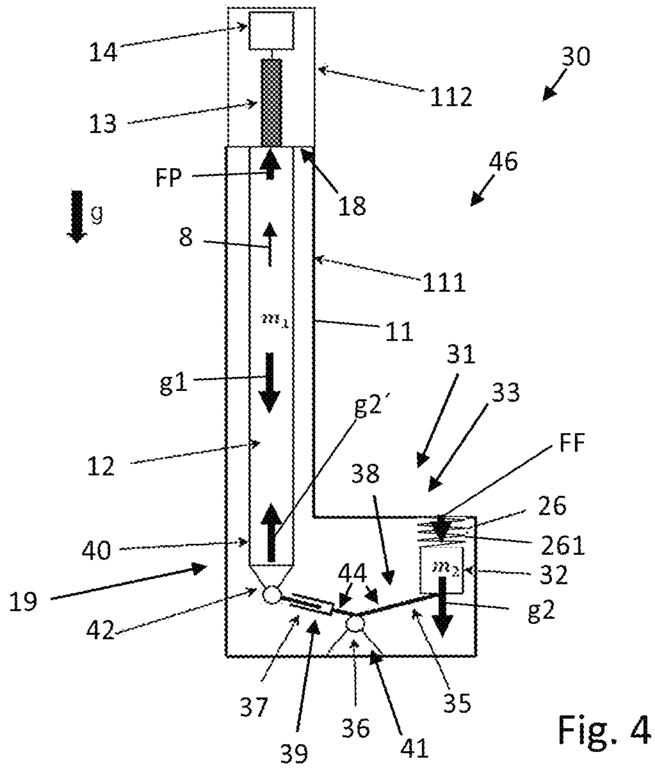
FIG. 4 shows a side elevation of a measuring device according to the present disclosure.
Figure 5:
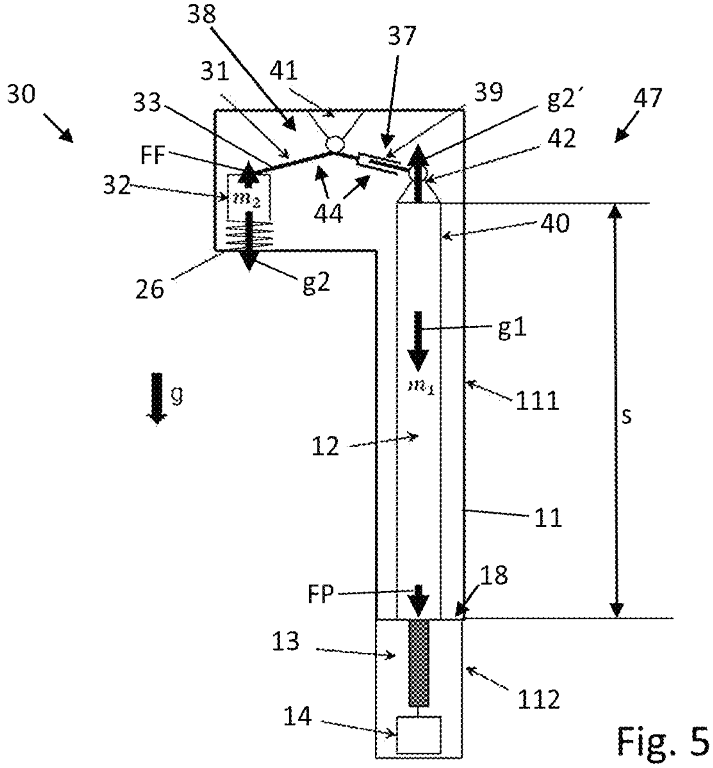
FIG. 5 shows the measuring device of FIG. 4 in another mounting position.

FIGS. 4 and 5 show a radiometric level, density, mass flow and/or limit level measuring device 30 comprising a housing 11, which accommodates a scintillator 12 for generating radiation-induced light pulses 8 and encloses the scintillator 12. The measuring device 30 also comprises a photosensitive element 13 in the form of a photomultiplier for generating electrical signals based on the light pulses 8 and an evaluation unit 14 for evaluating the electrical signals and for determining a measured value. The scintillator 12 is pressed against an abutment 18 within the housing 11 by means of at least one return element 26 in order to achieve an optical coupling of the scintillator 12 to the photosensitive element 13 with a contact force FP. The measuring device 30 comprises a compensation device 31, having a counterweight 32 and a force transmission device 33. By means of the force transmission device 33, the weight force g2 of the counterweight 32 can be transferred to the scintillator 12 in such a way that said force acts on the scintillator 12 against the weight force g1 of the scintillator 12.

The scintillator 12 has a square cross-section and has a longitudinal extension extending parallel to its length s. The housing comprises a first housing section 112, into which the photosensitive element 13 and the evaluation unit 14 are integrated, and a second housing section 111, in which the scintillator 12 and the compensation device 31 are arranged.

FIG. 4 shows a first mounting position 46 of the measuring device 30, in which the scintillator 12 is arranged below the abutment 18. FIG. 5 shows a second mounting position 47, in which the scintillator is arranged above the abutment 18. The longitudinal extension of the scintillator 12 in the first and second mounting positions runs vertically.

The mass m2 of the counterweight is at least approximately the same size as the mass m1 of the scintillator 12 and the contact force FP corresponds to the force exerted by the return element on the scintillator in the two mounting positions shown in FIG. 4 and FIG. 5, which in the embodiments shown is the pretensioning force FF of the return element 26 designed as a helical compression spring 261.

FIGS. 4 and 5 show that the force transmission device 33 transmits the weight force g2 of the counterweight 32 onto the scintillator 12 in such a manner that the transferred weight force g2' of the counterweight in both mounting positions 46, 47 acts against the weight force g1 of the scintillator 12 on the latter.

The compensation device 31 causes a mechanical compression stress in the critical region 40 of the scintillator 12 in the first mounting position 46 and in the same region 40, a mechanical tensile stress in the second mounting position 47 of the measuring device. The pretensioning force FF of the return element 26 is smaller than the weight force g1 of the scintillator 12. In the two mounting positions shown in FIGS. 4 and 5, the size of the contact force FP corresponds at least approximately to the size of the pretensioning force FF.

FIGS. 4 and 5 also show that the force transmission device 33 comprises a balance 44, which mechanically couples the counterweight 32 to the scintillator 12. The balance 44 comprises a two-sided lever 35 mounted with its pivot point 36 on the housing 11 by means of a rotary bearing 41, having a first lever arm 37 and a second lever arm 38. The scintillator 12 is attached to the first lever arm 37 by means of a further rotary bearing 42 and the counterweight 32 is attached to the second lever arm 38. This additional rotary bearing 42 preferably comprises a first bearing part assigned to the scintillator and glued thereto, and a second bearing part assigned to the first lever arm. In the exemplary embodiment shown in FIGS. 4 and 5, only the first lever arm 37 can be varied in length by means of a parallel guide 39, to prevent a tilting moment being exerted on the scintillator 12, and the counterweight 32 is fixedly attached to the second lever arm 38. The return element 26 exerts a spring force on the scintillator 12 indirectly by means of the force transmission device 33. It is arranged between the counterweight 32 and the housing 11.

FIGS. 6 to 9 illustrate further exemplary embodiments. The same reference signs refer to the same components. In this respect, reference is made to the above comments. In the following, only the differences relative to the exemplary embodiment shown in FIGS. 4 and 5 are shown.

Figure 6:
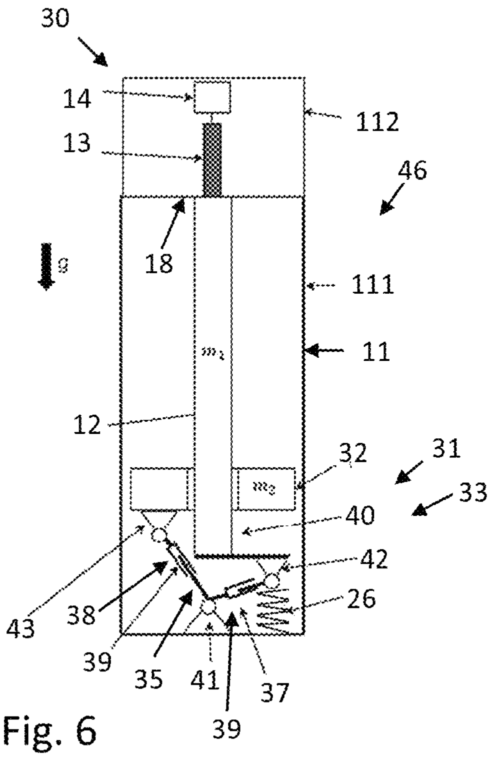
FIG. 6 shows a side elevation of a further measuring device according to the present disclosure.
Figure 7:
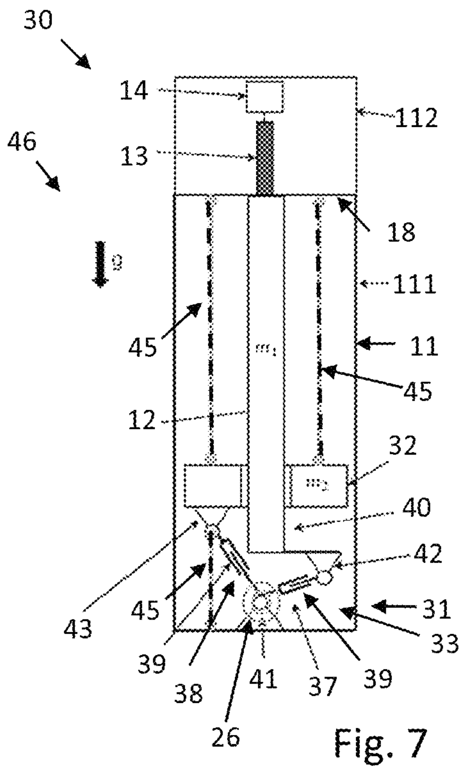
FIG. 7 shows a side elevation of yet a further measuring device according to the present disclosure.
Figure 8:
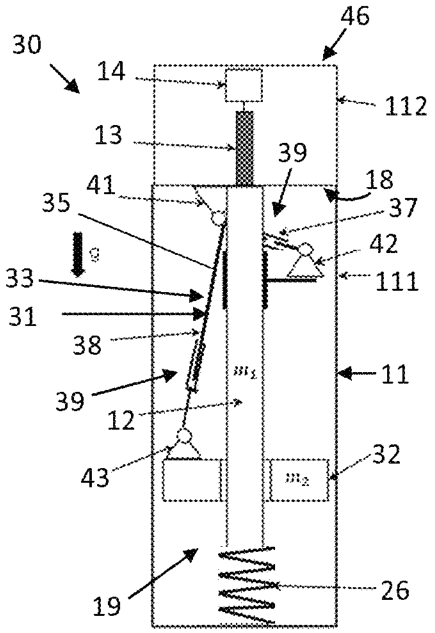
FIG. 8 shows a side elevation of yet a further measuring device according to the present disclosure.

In the exemplary embodiments shown in FIGS. 6 to 8, the second lever arm 38 can also be varied in length by means of a parallel guide 39 in order to enable an axially displaceable arrangement of the counterweight 31 around the scintillator 12, which in these exemplary embodiments is designed as a tubular weight arranged around the scintillator. In the exemplary embodiments shown in FIGS. 6 to 8, the counterweight 32 is attached to the second lever arm 38 by means of an additional rotary bearing 43 which is implemented between the scintillator 12 and the first lever arm 37 in the same way as the additional rotary bearing 42.

In the exemplary embodiment shown in FIG. 6, the return element is arranged between the additional rotary bearing 42, which is arranged between the scintillator and the first lever arm 37, and the housing 11.

In the exemplary embodiment shown in FIG. 7, the return element 26 can be arranged at multiple different positions and implemented in different ways. The dashed line in each case indicates an arrangement or a spring clamping path 45 between the additional rotary bearing 43, with which the counterweight 32 is attached to the second lever arm 38, and the housing 11, between the counterweight 32 and the abutment 18 and—with a design as a torsion spring—on one of the rotary bearings, more precisely on the rotary bearing 41 which supports the two-sided lever 35 on the housing 11.

In the exemplary embodiment shown in FIG. 8, the attachment of the scintillator 12 to the first lever arm 37 is not implemented at the free end 19 of the scintillator, but instead on the third of the scintillator 12 facing the abutment 18 and the return element 26 is arranged between the free end 19 of the scintillator and the housing.

Figure 9:
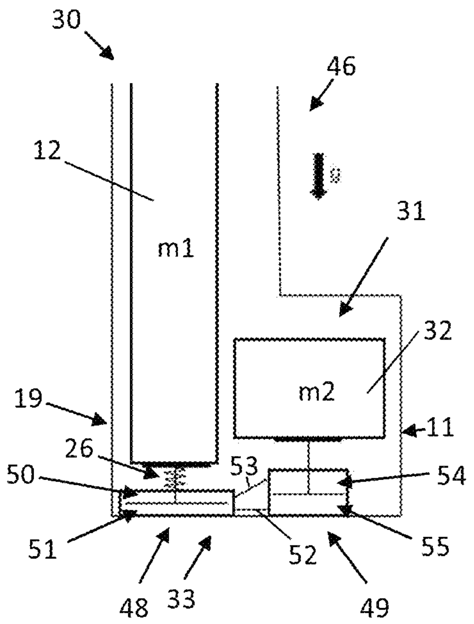
FIG. 9 shows a detail of a side elevation of yet a further measuring device according to the present disclosure.

In the exemplary embodiment shown in FIG. 9, instead of a mechanical coupling of the counterweight 32 with the scintillator 12, a hydraulic coupling is used. For this purpose, the force transmission device 33 of the compensation device 31 has two fluid cylinders 48, 49 in the form of double-acting hydraulic cylinders. One of the fluid cylinders 48 interacts with the scintillator and is arranged between the scintillator 12, more precisely its free end 19, and the housing 11. The two chambers 50, 51 of this fluid cylinder 48 are each connected by means of hydraulic lines 52, 53 to the chambers 54, 55 of the other fluid cylinder 49 which interacts with the counterweight 32. This other fluid cylinder 49 is arranged between the counterweight 32 and the housing 11. Both fluid cylinders 48, 49 are each designed as differential cylinders with a piston rod-side annular volume and a piston-side volume and the two piston rod-side annular volumes of the two fluid cylinders are connected to each other via a hydraulic line 53. The two piston-side volumes are connected via a further hydraulic line 52. In the event of a change in length of the scintillator 12 relative to the housing 11, a displacement of the two pistons and a compensation can preferably take place via both fluid lines 52, 53. In the first mounting position 46 shown in FIG. 9, the weight force g2 of the counterweight 32 is transmitted to the scintillator 12 in particular via the hydraulic line 52, shown at the bottom, against the weight force g1 of the scintillator 12. In a second mounting position 47, which is rotated relative to the mounting position shown in FIG. 9, in which the scintillator 12 is arranged above the abutment, not shown in FIG. 9 for drawing-related reasons, the counterweight 32 hangs on the hydraulic cylinder 49 and its weight force g2 is transmitted to the scintillator 12 in particular via the other hydraulic line 53. The fluid cylinder 48, which interacts with the scintillator and is shown on the left in FIG. 9, is designed as a short stroke cylinder with a stroke depending on the scintillator length of, for example, approximately 20 mm for scintillator lengths less than 1.5 m. The mass m2 of the counterweight corresponds in this exemplary embodiment to half the mass m1 of the scintillator. The piston surface of the fluid cylinder 49, which interacts with the counterweight and is shown on the right in FIG. 9, is half the size of the piston surface of the fluid cylinder 48 that interacts with the scintillator. The same applies to the piston ring surfaces. Also, the piston ring surface of the fluid cylinder 49 which interacts with the counterweight is thus half the size of the piston ring surface of the fluid cylinder 48 which interacts with the scintillator. The stroke of the fluid cylinder 49 which interacts with the counterweight is twice the size of the stroke of the fluid cylinder 48 which interacts with the scintillator. The return element 26 is arranged between the housing of the fluid cylinder 48 interacting with the scintillator 12 and the scintillator 12. The ends of the piston rods facing away from the pistons are each fixedly connected, for example glued and/or screwed, to the scintillator 12 or the counterweight 32 respectively. They point in the same direction, namely in FIG. 9 upwards. The piston rods of both fluid cylinders 48, 49 run parallel to each other and to the longitudinal extension of the scintillator 12.

REFERENCE SIGNS

1 tank
3 radiation source
8 light pulse
11 housing
111 first housing section
112 second housing section
12 scintillator
13 photosensitive element
14 evaluation unit
18 abutment
19 free end (of the scintillator)
26 return element
261 helical compression spring
30 measuring device
31 compensating device
32 counterweight
33 force transmission device
35 two-sided lever
36 pivot point
37 first lever arm

38 second lever arm
39 parallel guide
40 critical region
41 rotary bearing
42 additional rotary bearing
43 additional rotary bearing
44 balance
45 possible spring clamping distances
46 first mounting position
47 second mounting position
48, 49 fluid cylinders
50, 51 chambers
52, 53 hydraulic lines
54, 55 chambers
g Earth's gravitational field
g1 weight force of the scintillator
g2 weight force of the counterweight
g2' weight force of the counterweight transmitted to the scintillator
m1 mass of the scintillator
m2 mass of counterweight
s length of the scintillator
FP contact force
FF pretensioning force

The invention claimed is:

1. Radiometric level, density, mass flow and/or limit level measuring device having a housing which accommodates a scintillator for generating radiation-induced light pulses, a photosensitive element for generating electrical signals based on the light pulses, and an evaluation unit for evaluating the electrical signals and for determining a measured value, wherein the scintillator is pressed within the housing against an abutment with a contact force (FP) by means of at least one return element, wherein the measuring device comprises a compensation device, having a counterweight and a force transmission device, and by means of the force transmission device, the weight force (g2) of the counterweight can be transferred to the scintillator in such a way that said force acts on the scintillator against the weight force (g1) of the scintillator.

2. Measuring device according to claim 1, wherein the return element comprises a spring and is arranged pretensioned in the measuring device, wherein the pretensioning force (FF) is smaller than the weight force of the scintillator.

3. Measuring device according to claim 1, wherein the force transmission device comprises a balance.

4. Measuring device according to claim 3, wherein the balance comprises a two-sided lever with a first lever arm and a second lever arm, which is mounted with its pivot point on the housing by means of a rotary bearing.

5. Measuring device according to claim 4, wherein the scintillator is fixed to the first lever arm and the counterweight is fixed to the second lever arm.

6. Measuring device according to claim 4, wherein the first lever arm and/or the second lever arm comprise a parallel guide.

7. Measuring device according to claim 4, wherein the scintillator is fixed to the first lever arm on the half of the scintillator facing the abutment.

8. Measuring device according to claim 1, wherein the force transmission device comprises two fluid cylinders.

9. Measuring device according to claim 1, wherein the counterweight is arranged spatially next to the scintillator.

10. Measuring device according to claim 1, wherein the counterweight is arranged so as to be axially displaceable around the scintillator as a tubular weight.

11. Measuring device according to claim 1, wherein the return element is arranged between the counterweight and the housing.

* * * * *